United States Patent Office 2,780,530
Patented Feb. 5, 1957

2,780,530

METHOD OF CONCENTRATING SOLUTIONS WITHOUT EVAPORATION

Felix Alfred Schaufelberger, Stamford, Conn., assignor to Chemical Construction Company, New York, N. Y., a corporation of Delaware No Drawing. Application February 5, 1954, Serial No. 408,606

6 Claims. (Cl. 23—293)

This invention relates to a process for the concentration of solutions and more particularly to a process for the concentration of solutions without evaporation.

The concentration of compounds in solutions is a major industrial operation. A great many industrial chemical processes today call for the concentration of solutions either in the production of the finished product or in the production of a by-product of one kind or another. Much of the industrial concentration of solutions leads to the recovery of various salts. In other instances the concentration is carried out in order that additional process steps may be more efficiently accomplished, as for example, a metals-containing solution may be concentrated in order that the reduction of the metal salt to the metal itself may be accomplished more efficiently.

In the past concentration of solutions has been accomplished most commonly by evaporation. This has meant that sufficient energy must be supplied to evaporate a large portion of the solvent, usually water. Evaporation was carried out either at elevated temperatures and atmospheric pressure or lower temperatures under vacuum. In many cases up to 75% of the solvent had to be evaporated before the solution could be sufficiently concentrated. The high cost of fuel needed to supply the heat necessary for evaporation or to supply the power necessary to achieve the required vacuum has been an outstanding disadvantage in the evaporation method of concentration. Many of the existing concentration processes use a barometric condenser to supply vacuum. A barometric condenser uses large quantities of water, and water is a commodity that is growing ever dearer on the American industrial scene.

Thus there has been the need for a method of concentrating solutions which eliminates in large measure the above-described disadvantages of the prior methods of concentration. It is the principal object of the present invention to supply such a need.

This object has been achieved in a surprisingly efficient manner. A solution containing dissolved compounds is heated under pressure to a temperature substantially higher than the boiling point of the solution at atmospheric pressure. The temperature to which the solution is heated must be sufficiently high to cause precipitation of the dissolved solids from the liquid. Supernatant liquid is then removed to the desired extent. The remaining liquid may then be cooled to the desired temperature to obtain a solution or slurry more concentrated than was the original solution.

The basis for this process of concentrating solutions is that the solubility of most compounds after first increasing with increasing temperature up to a first temperature of about 100°–150° C. which is substantially higher than the boiling point of the solution at atmospheric pressure and then decreases with further temperature increase up to about the critical temperature. The solubility of many compounds becomes practically zero at the critical temperature, which is 374° C. in the case of water. There is, of course, a good deal of variation between the solubility curves of various salts. For this reason a solution of one salt may be efficiently concentrated by heating the solution to a temperature of 200° C., while another salt may require heating to a temperature of 300° C. or even higher. In each case, however, the salt or salts precipitate out and tend to settle to the bottom of the vessel. When this happens the supernatant liquid which has been depleted of the salt or salts may be removed. As the remaining liquids cools, the precipitated salt goes back into solution. This results in an effective concentration of the original solution.

On some occasions the precipitated salt may not go completely back into solution on cooling. This can happen if a large quantity of the supernatant fluid is removed, particularly if the temperature has been high enough so that the salt is practically insoluble in the supernatant fluid. Under these conditions the remaining liquid will contain undissolved salts.

As in conventional operation, it is possible with the new process of the present invention to carry out the concentration stepwise. Where two or more salts are dissolved in a solution it is possible to heat the solution to a temperature at which one of the salts becomes substantially completely insoluble while one or more of the remaining salts stays in solution. By removing the supernatant liquid an enrichment of one of the salts is obtained. The enrichment of a solution that contains more than one salt will depend on the behavior of the various salts at elevated temperatures. Solubility conditions and relationships in the temperature range close to the critical temperature may be entirely changed as compared with those that exist under more conventional conditions. Where enrichment of the solution in one salt at the expense of another is desired, the solubilities of the salts at the higher temperatures must be known.

In some cases, solution enrichment will be impractical because the solubility characteristics of the salts are too similar. No two salts behave exactly alike in the temperature range near the critical temperature but the difference in the behavior may be too small to make enrichment a practical process. However, with a few exceptions it will always be possible to strip the solution of all the salts by heating the solution to a sufficiently high temperature.

Pressure must be used once the solution becomes heated to a temperature above its boiling point at atmospheric pressure. The best way to accomplish this is to carry out the heating operation in an autoclave or similar pressure vessel. It is not necessary to impose any special pressure control. The mere heating of the solution in the pressure vessel will produce increasing pressure as the temperature of the solution rises. It is, of course, impossible to achieve the temperatures called for by the process of the present invention unless pressure is maintained; no solution can be heated to a temperature substantially above its boiling point at atmospheric pressure unless additional pressure is maintained on the solution. In the present process then the pressure is self-adjusting and is maintained simply by heating the solution in a sealed vessel which is sufficiently strong to withstand the resultant pressures.

The supernatant liquid may be removed by any convenient means. Usually it is preferred to have a leg extend down into the autoclave from the top. The supernatant liquid may be readily removed through such a leg simply by opening a let-down valve in the leg or by installing a blowcase at the outlet of the leg.

If the hot supernatant liquid contains a sufficiently small amount of salts to make recovery uneconomical the hot liquid can be used to generate power in a turbine. If the liquid contains an appreciable amount of any salt or salts it may be treated further by the process of the present invention or it may be passed into a flash-chamber in order that some of the excess solvent may be flashed off. In any case it will often be desirable to use the hot supernatant liquid to heat the incoming solution in heat exchangers.

The process of the present invention can be used to concentrate solutions of most salts. There are, however, a few exceptions, notably in those salts whose anion consists of a halogen. Such salts as cadmium bromide, cadmium iodide, strontium bromide, barium bromide, and strontium chloride show increasing solubilities even well above the critical temperature of water. This means that the salts continue to be soluble in the vapor phase. A notable exception to the behavior of these halogen-containing salts is barium chloride. The solubility of barium chloride sharply drops off as the temperature of the solution approaches the critical temperature. At the critical temperature barium chloride is substantially insoluble. By taking advantage of this fact a solution may be readily depleted of barium chloride.

Some of the metals whose salts can be concentrated in solution by the process of the present invention are as follows: aluminum, antimony, arsenic, barium, bismuth, cadmium, calcium, cobalt, chromium, copper, gold, iron, lead, lithium, magnesium, manganese, mercury, nickel, platinum, potassium, silver, sodium, strontium, tin and zinc. These metals when is the form of their salts, such as the sulfate or nitrate or occasionally the halogen all lend themselves to concentration by the process of the present invention. Although water will be the solvent most commonly encountered the process of the present invention may utilize other solvents too. The critical temperature varies according to which solvent is being utilized. For instance, ethyl alcohol has a critical temperature of 243° C.; acetone 235° C.; normal butyl alcohol 287° C.; ethyl propyl ether 227° C.; chlorobenzene 359° C.; benzene 288.5° C. The critical temperature of any of the solvents may be determined by reference to such publications as the International Critical Tables.

In each case the solubility of salts in the solvent often undergoes drastic change at or near the critical temperature. Once the solution has been heated to a temperature near the critical temperature in a suitable vessel the supernatant liquid may be removed in order that the solution remaining in the vessel be concentrated or enriched in one or more of the salts that were present in the original solution.

The temperature range to which the solutions to be concentrated must be heated will of course vary according to the various dissolved salts. Where water is the solvent, heating to slightly under the critical temperature of water, 374° C., will precipitate almost all salts. A temperature of 370° C. suffices for this purpose. The decreased solubility of some salts becomes apparent at about 150° C. However for the majority of salts no appreciable decrease in solubility takes place until the temperature rises to about 190° C. The most common temperature range to be used in the process of the present invention is about 200°–275° C. Most of the time good results can be had by utilizing a temperature in the range of about 220–250° C.

The major advantages of the present invention are that solutions can be concentrated without having to evaporate substantial amounts of the solvent first. The only energy required is that needed to heat the solution to the desired temperature, and this is a great deal less than that needed to bring about the equivalent evaporation. This energy can be partially recovered by heat exchange of the supernatant liquid with the incoming solution or by producing power in turbines, or both. The expansion of the heated supernatant liquid through a turbine also permits the evaporation of some water which is a desirable feature in certain flow sheets as a means of keeping the quantities of water in the production cycle constant. At high enough temperatures the solutions can be stripped even quantitatively so that the supernatant liquid does not have to be recycled and can be discarded to the extent desired. Although the process of the present invention must be carried out in high pressure equipment, costs of installation compare favorably with costs of conventional evaporation with the further advantage that the residence time is remarkably shorter.

The present invention may be better understood by reference to the examples which follow. The examples are given by way of illustration of the invention and are not to be construed as limiting it.

*Example 1*

A water solution containing 584 grams of $MnSO_4$ per liter of solution is placed in an autoclave and heated to 300° C. in 10 minutes and maintained at 300° C. for an additional 10 minutes. At the end of that time the upper half of the liquid in the clave is removed; this liquid contains 30 grams $MnSO_4$ per liter of solution. The clave and contents are then cooled to below 100° C. The contents consist of a slurry of 1,153 grams $MnSO_4$ per liter of slurry. The results are the same when the original solution also contains 1% $H_2SO_4$.

*Example 2*

The procedure of Example 1 is repeated except that the solution is held at 300° C. for a period of 2 hours. When the supernatant liquid is removed it is found to contain 2.2 grams $MnSO_4$ per liter. On cooling the slurry is found to consist of 1,167 grams $MnSO_4$ per liter of slurry.

*Example 3*

A water solution containing 164 grams $FeSO_4$ per liter of solution is placeed in an autoclave, heated to 250° C., and maintained at that temperature for two hours. The upper half of the liquid in the clave is then drawn off; this liquid contains 0.75 gram $FeSO_4$ per liter. On cooling, the clave contents consist of a slurry of 327 grams $FeSO_4$ per liter. No change is noted when the original solution also contains 5% $H_2SO_4$.

*Example 4*

A water solution containing 126 grams $MgSO_4$ per liter of solution is heated to 210° C. and held at that temperature for 10 minutes. About half the liquid containing 15 grams $MgSO_4$ per liter is withdrawn from the autoclave. The remaining solution has a concentration of 243 grams $MgSO_4$ per liter of solution. When the original solution is maintained at 210° C. for two hours, the withdrawn solution has a centration of 5 grams $MgSO_4$ per liter and the remaining solution has a concentration of 249 grams $MgSO_4$ per liter.

*Example 5*

A water solution containing 175 grams $BaCl_2$ per liter of solution is heated to 350° C. and held at that temperature for two hours. About one-quarter of the liquid containing 3 grams $BaCl_2$ per liter is withdrawn from the autoclave. The remaining solution has a concentration of 233 grams $BaCl_2$ per liter.

*Example 6*

A water solution containing 80 g. $CuSO_4$ per liter of solution is heated to 300° C. and held at that temperature for 30 minutes. One half of the liquid containing 9.5 g. $CuSO_4$ per liter is withdrawn from the autoclave. On cooling the remaining solution is found to have a concentration of 150.5 g. $CuSO_4$ per liter.

*Example 7*

A water solution containing 60.5 g. $NiNO_3$ per liter of solution is heated to 250° C. and held at that temperature for 30 minutes. About one half of the supernatant liquid is removed; this liquid contains 2.9 g. $NiNO_3$ per liter.

The cooled solution remaining in the autoclave has a concentration of 118 g. $NiNO_3$ per liter.

Example 8

A water solution containing 89.5 g. sodium phosphate ($Na_2HPO_4 \cdot 12H_2O$) per liter is heated to 250° C. and one half the supernatant liquid is immediately withdrawn. The supernatant liquid has a concentration of 33 g. sodium phosphate per liter. The remaining solution has a concentration of 146 g. sodium phosphate per liter.

Example 9

A water solution containing 71 g. sodium silicate ($Na_2SiO_3 \cdot 9H_2O$) per liter is heated to 250° C. One half the supernatant liquid is immediately withdrawn; this liquid has a concentration of 31 g. sodium silicate per liter. On cooling, the remaining solution is found to have a concentration of 111 g. sodium silicate per liter.

When the original solution is heated to 300° C., no substantial increase in concentration is obtained over the increase obtained at 250° C.

I claim:

1. A method of treating a solution to increase the concentration of at least one dissolved salt of an inorganic acid, the total solubility of which salt in said solution decreases as the temperature of said solution is increased from a first temperature above about 150° C. to a second temperature above said first temperature but below the critical temperature of the solvent, said treatment comprising: heating said solution, under a pressure at least that autogeneously developed but below the critical pressure, to a treating temperature which is (a) substantially above said first temperature (b) below said critical temperature and (c) sufficiently high to cause precipitation of at least part of said dissolved salt from said solution; removing a portion of the resultant liquid and then cooling the residual solution and solids to a third temperature which is below the boiling point at atmospheric pressure.

2. A process according to claim 1 in which the volume of said residual solution is at least sufficient to redissolve all said solids on cooling to said third temperature.

3. A method according to claim 1 in which said treating temperature is in the range of from about 200° C. to about 275° C.

4. A method of treating an aqueous solution to increase the concentration of at least one dissolved salt of an inorganic acid, the total solubility of which salt in said solution decreases as the temperature of said solution is increased from a first temperature above about 150° C. to a temperature of about 374° C., said treatment comprising: heating said solution, under a pressure at least that autogenously developed but below the critical pressure, to a treating temperature substantially above said first temperature but below about 374° C., at which precipitation of a portion of said salt occurs, removing a portion of the resultant liquid and then cooling the residual solution and solids to a temperature below the boiling point at atmospheric pressure.

5. A method according to claim 4 in which said treating temperature is in the range of from about 200° C., to about 275° C.

6. A method according to claim 4 in which the portion of said resultant liquid which is removed is about one-half the volume of said resultant liquid.

References Cited in the file of this patent

UNITED STATES PATENTS

| | | |
|---|---|---|
| 2,520,186 | Von Platen | Aug. 29, 1950 |
| 2,723,956 | Johnson | Nov. 15, 1955 |

OTHER REFERENCES

Walton et al.: "Nature," vol. 159, No. 4033, Feb. 15, 1947, pages 232 and 233.